US005398137A

United States Patent [19]

Ishikawa et al.

[11] Patent Number: 5,398,137

[45] Date of Patent: Mar. 14, 1995

[54] LENS FOR A LAMP AND METHOD OF PRODUCING A DIE THEREFOR

[75] Inventors: Masahito Ishikawa; Toshimasa Kodera, both of Shizuoka, Japan

[73] Assignee: Koito Manufacturing Co., Ltd., Tokyo, Japan

[21] Appl. No.: 990,249

[22] Filed: Dec. 14, 1992

[30] Foreign Application Priority Data

Dec. 14, 1991 [JP] Japan .................................. 3-352000

[51] Int. Cl.[6] .................................................. G02B 3/08

[52] U.S. Cl. .................................... 359/742; 425/808; 359/743

[58] Field of Search ................. 359/742, 743; 425/808

[56] References Cited

U.S. PATENT DOCUMENTS

| | | | |
|---|---|---|---|
| 4,574,338 | 3/1986 | Takasaki et al. | 362/278 |
| 4,927,248 | 5/1990 | Sakakibara et al. | 359/743 |
| 4,969,783 | 11/1990 | Ozawa et al. | 409/132 |
| 4,993,807 | 2/1991 | Sakakibara | 359/743 |

FOREIGN PATENT DOCUMENTS

| | | |
|---|---|---|
| 0322370 | 6/1989 | European Pat. Off. . |
| 2629899 | 10/1989 | European Pat. Off. . |
| 9200487 | 1/1992 | European Pat. Off. . |

*Primary Examiner*—Scott J. Sugarman

*Attorney, Agent, or Firm*—Sughrue, Mion, Zinn, Macpeak & Seas

[57] ABSTRACT

A lens for a lamp having a non-planar portion in which a large number of Fresnel lens steps or prism steps are formed on the incident surface thereof, yet which produces a very parallel output beam. The lens steps are defined by a tangential vector at an arbitrary point of a refraction boundary surface (Fresnel lens steps) or a total-reflection surface (prism steps) which is in the same direction as an outer product of a normal vector of the refraction boundary surface or total-reflection surface and a normal vector of an exit surface of the lens at a refraction point where a ray refracted by the refraction boundary surface or total-reflection surface is refracted. A method is also disclosed for producing a die for forming such a lens.

16 Claims, 11 Drawing Sheets

LENS FOR A LAMP AND METHOD OF PRODUCING A DIE THEREFOR

BACKGROUND OF THE INVENTION

1. Field of the Invention

The present invention is intended to provide a lens for use in a lamp which can provide an even brightness distribution and a good visibility, and a method of producing a die for forming that lens.

2. Description of the Background Art

Among vehicular lamps is a type having a structure in which an inner lens for controlling direct light from a light source and reflection light from a reflector is disposed in a lamp space defined by a lamp body and an outer lens. The inner lens is a formed product of a transparent synthetic resin, and has Fresnel lens steps and prism steps on its one surface.

As shown in FIG. 16, a lamp 1 is designed to have a curved exit surface of an outer lens 2 that conforms to a body shape of a vehicle.

In the lamp 1, the optical axis x—x of a reflector 3 extends in the front-rear direction of the vehicle passing through the center of a filament of a bulb 4. An inner lens 5 is disposed between the bulb 4 and the outer lens 2. That is, the inner lens 5 is placed immediately inside the outer lens 2, and is influenced, like the outer lens 2, by the vehicle body shape to have an exit surface 6 assuming a curved shape.

The inner lens 5 consists of a plate-like portion 5*a* and a curved portion 5*b* that is continuous with the plate-like portion 5*a* and curved increasingly as the position reaches one end in the longitudinal direction. Fresnel lens steps 7, 7, . . . are formed on the inner surface in the vicinity of the optical axis x—x, and prism steps 8, 8, . . . are formed around the Fresnel lens steps 7, 7, . . .

FIG. 17 is a sectional view showing the main part a of a plate-like inner lens 5.

Fresnel lens steps b, b, . . . are formed on an incident surface of the inner lens a in the vicinity of the optical axis x—x of the reflector 3, and prism steps c, c, . . . are formed around the Fresnel steps b, b, . . . Through the refraction by the Fresnel lens steps b, b, . . . , the paraxial rays of the light emitted from a bulb d are controlled to become in parallel with the optical axis of the lamp. The outer rays of the light from the bulb d that depart from the optical axis of the lamp to go toward the peripheral area of the inner lens a are controlled through the total reflection by the prism steps c, c, . . . to become in parallel with the optical axis.

This structure is employed because the paraxial rays have small incident angles with respect to the inner lens a and can be controlled through the refraction phenomenon, but the outer rays departing from the optical axis have large incident angles with respect to the inner lens a. Accordingly, it is difficult to control the outer rays through refraction.

In order to accommodate the recent design trend that vehicle bodies are rounded or streamlined to improve the aerodynamic characteristics of vehicles and to satisfy requirements on design, it is necessary to design a lamp shape to have a curve that conforms to the external shape of a vehicle body or to have an inclination to the vertical direction. Therefore, it is not possible for the inner lens to be limited to a plate-like shape, that is, in general the inner lens is required to include a curved shape.

FIG. 18 conceptually shows an example of a method of forming lens steps on a curved surface of an inner lens.

To simplify the description, it is assumed that lens steps are to be formed on a spherical surface, as shown in FIG. 18. There may be conceived a method in which a plate-like inner lens f on which lens steps are to be formed based on concentric reference circles e, e, . . . is employed as a reference model of design, and the concentric reference circles e, e, . . . are projected onto a spherical surface g. In this case, Fresnel lens steps and prism steps are formed on the spherical surface g based on reference circles h, h, . . . that are concentric to the optical axis.

While the above method permits a relatively easy design, it will encounter a difficulty in precisely controlling the light paths. As a result, parallel rays cannot be obtained over the entire surface of the inner lens, and the brightness distribution will be uneven.

This is a natural result of a fact that fine optical designing is not performed on the lens steps in accordance with the surface shape of the inner lens. The portion of the inner lens that is not very curved, i.e., generally flat portion 5*a*, will not cause any problems. But the portion 5*b* in which the curvature varies greatly will cause a considerable deviation from the desired brightness distribution due to a contribution of unexpected rays.

To avoid the above problem, it is necessary to alter the method of forming the lens steps. However, according to the above method, a proper course of designing cannot be obtained easily. Therefore, much time and work are needed to design the inner lens, and its final design and performance will depend on experiences of a designer.

SUMMARY OF THE INVENTION

To solve the above-described problems, according to the present invention, a lens for a lamp in which a large number of Fresnel lens steps and/or prism steps are formed on an incident surface of the lens having a curved portion, is characterized in that a tangential vector at an arbitrary point of a refraction boundary surface of the Fresnel lens steps or a total-reflection surface of the prism steps coincides with an outer product of a normal vector of the refraction boundary surface of the Fresnel lens steps or the total-reflection surface of the prism lens steps and a normal vector of an exit surface of the lens at a refraction point where a ray refracted by the refraction boundary surface of the Fresnel lens steps or reflected by the total-reflection surface of the prism steps is refracted.

Further, according to the invention, there is a method of producing a die for forming a lens for a lamp in which a large number of Fresnel lens steps and/or prism steps are formed on an incident surface of the lens having a curved portion. According to that method, a direction of an incident ray with respect to an exit surface is first determined according to the law of refraction and based on a normal direction at a refraction point of the exit surface and a direction of parallel rays so that exit rays from the lens become the parallel rays. Then, a refraction boundary surface is determined according to the law of refraction in the case of the Fresnel lens steps or a total-reflection surface is determined according to the law of reflection in the case of the prism steps, based on a direction of an incident ray with respect to the incident surface of the lens and the direction of the incident ray with respect to the exit surface that is obtained above. Next, a vector calculated as an outer product of a normal vector of the refraction boundary surface of the Fresnel lens steps or the total-reflection surface of the prism steps and the normal vector at the refraction point of the exit surface is employed as a direction vector for determining a direction of forming the refraction boundary surface or total reflection surface. Then, a closed curve is generated by connecting these direction vectors as tangential vectors using spline approximation. Finally, a V-shaped groove having a slanting surface corresponding to the refraction boundary surfaces and/or the total-reflection surfaces is formed on a die material along the closed curve.

DESCRIPTION OF THE PREFERRED EMBODIMENTS

Figure 16:
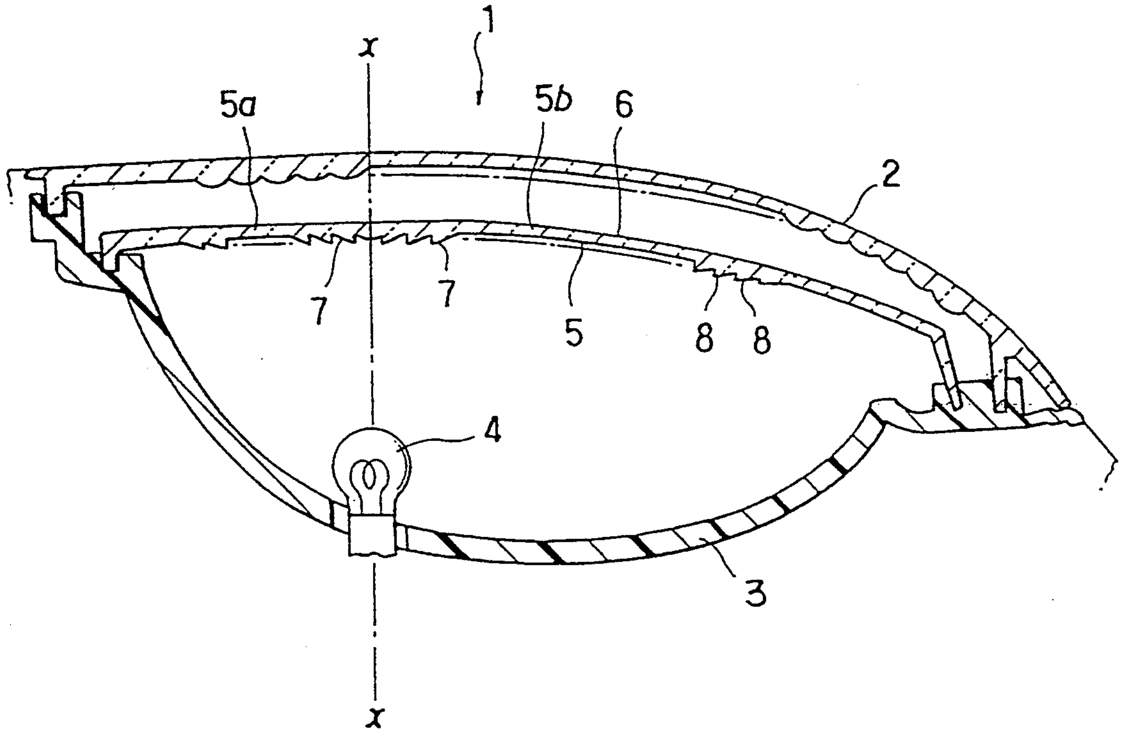
FIG. 16 is a sectional view schematically showing an example of a conventional configuration of a vehicular lamp.
Figure 17:
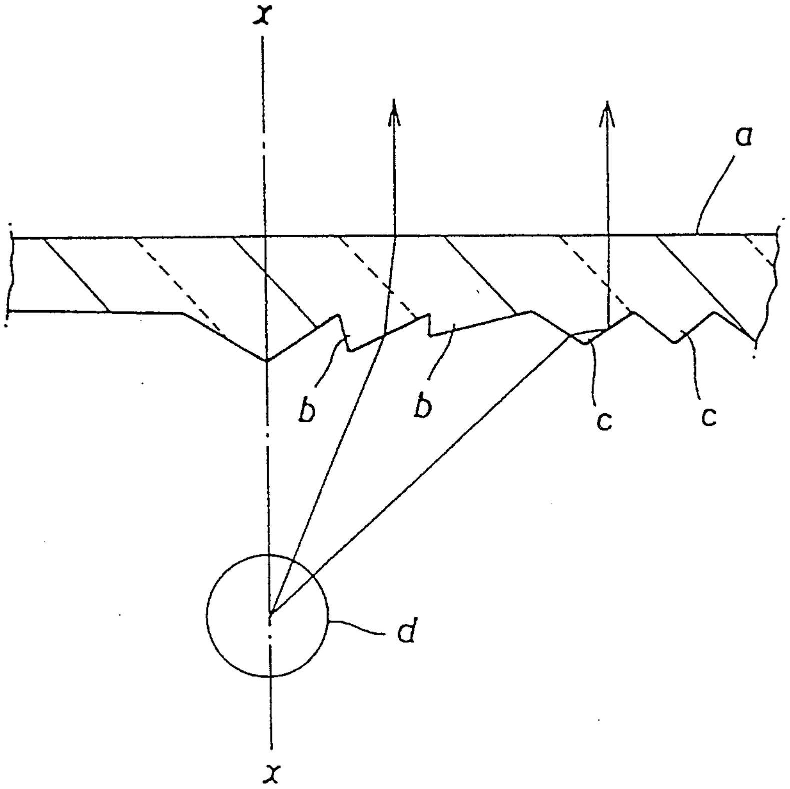
FIG. 17 PRIOR ART
FIG. 17 is a sectional view schematically showing Fresnel lens steps and prism steps formed on a plate-like inner lens.
Figure 18:
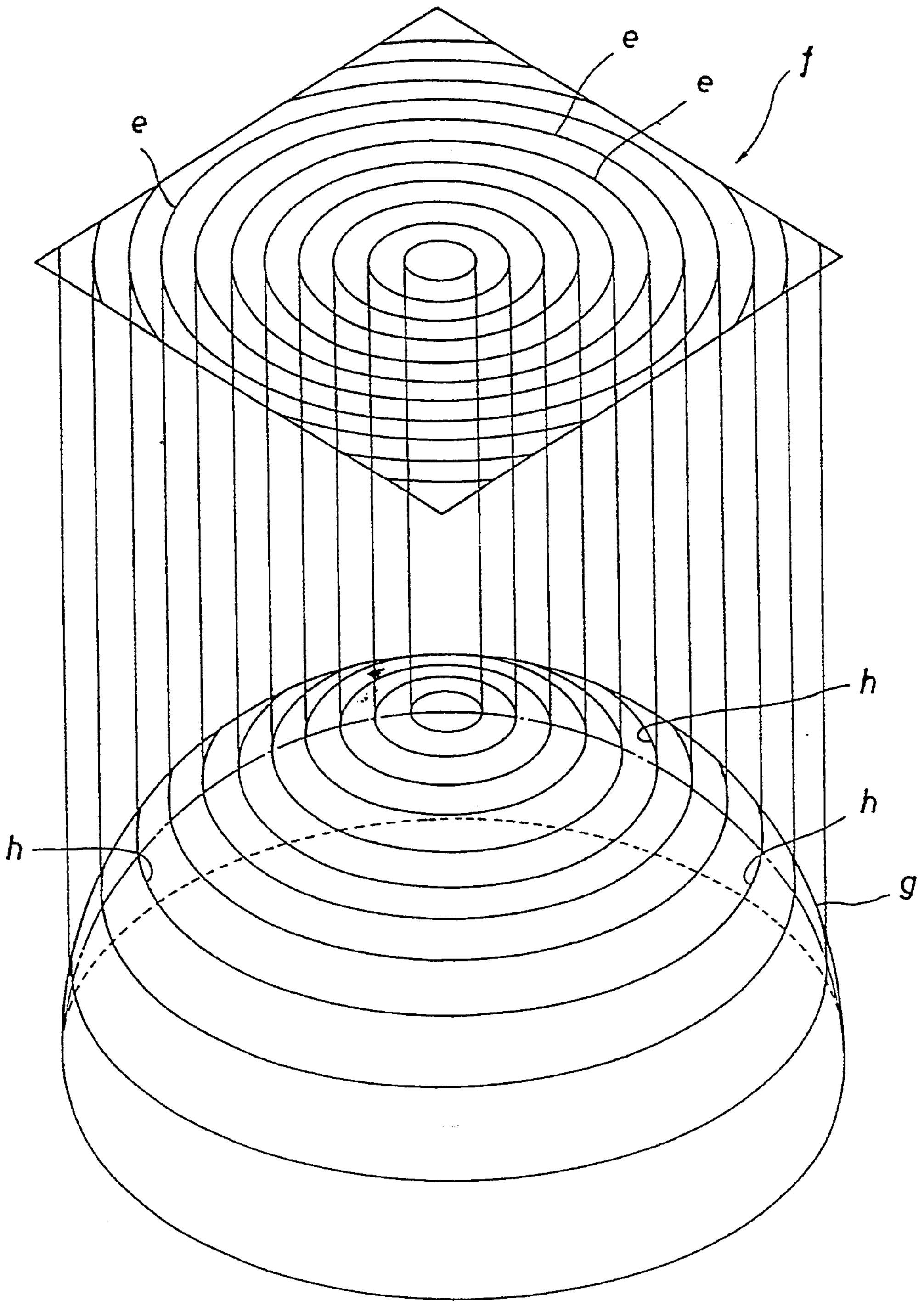
FIG. 18 PRIOR ART
FIG. 18 is a schematic drawing showing how concentric reference circles, which are necessary in the design stage of a process of forming the Fresnel lens steps and prism steps on the plate-like inner lens, are projected onto a spherical surface.

FIG. 16, which previously was described, shows a configuration of an inner lens of a tail lamp of a vehicle to which the invention may be applied.

According to the invention, the slope of the refraction boundary surface of the Fresnel lens step or the total-reflection surface of the prism step that corresponds to the refraction point on the exit surface of the lens is determined so as to conform to the curved shape of the exit surface, i.e., so that rays refracted by the refraction boundary surface of the Fresnel lens step or totally reflected by the total-reflection surface of the prism step are refracted by the exit surface to become parallel rays. As a result, there can be avoided an unevenness in the brightness distribution that would otherwise be caused by light not precisely controlled. Further, the Fresnel lens steps and the prism steps can be designed according to the procedure that is clear in terms of optics.

A lens for a lamp and a method of producing a die therefor according to the present invention are described hereinafter by way of an embodiment accompanied by the drawings.

Figure 1:
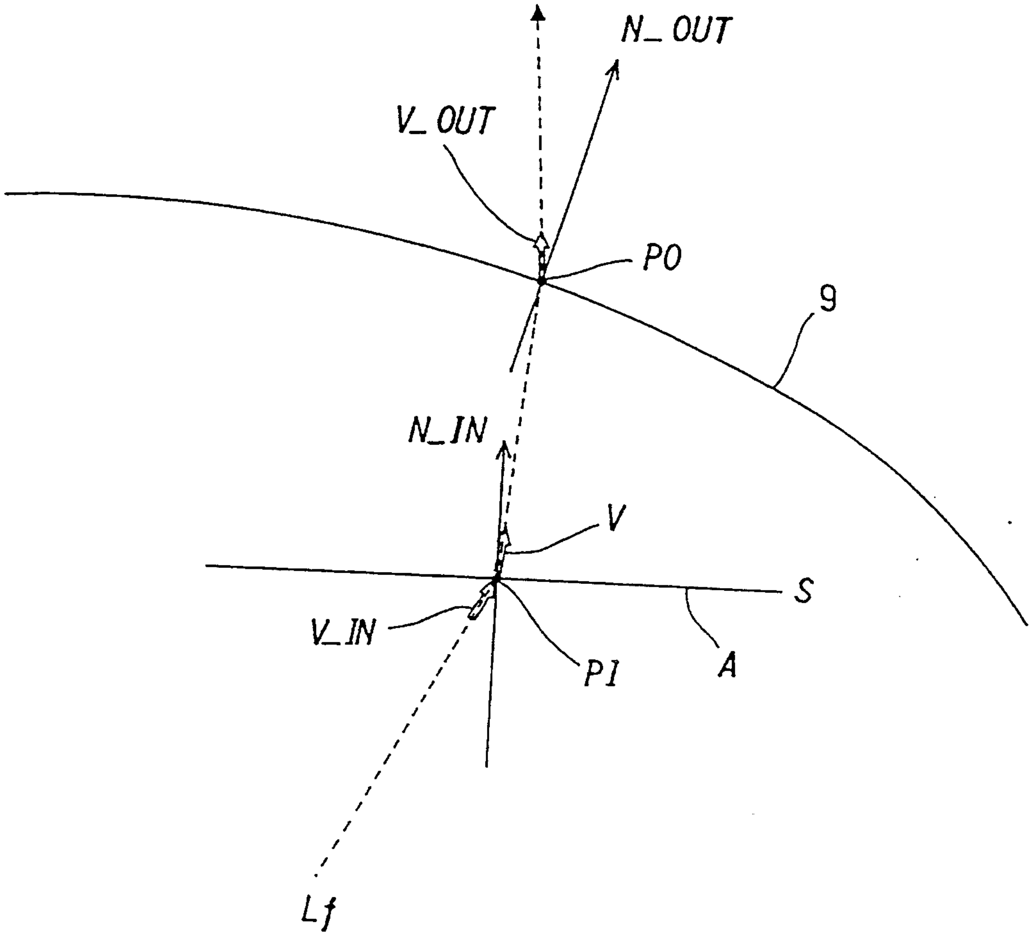
FIG. 1 is a light path diagram illustrating a Fresnel lens step according to the present invention.

FIG. 1 illustrates a, refracting action of the Fresnel lens steps 7, 7, . . . , where a light ray is refracted twice while passing through a lens step. Reference numeral 9 denotes a curve that represents the exit surface 6 of the inner lens 5, and is a cross-sectional line obtained when the exit surface 6 is cut by a horizontal plane containing the optical axis. This line is first given as a shape conforming to the vehicle body shape. A broken line Lf in FIG. 1 indicates a light path. A vector V_IN is a direction vector of an incident ray, and a vector V is a direction vector of a refracted ray.

Reference character A denotes a straight line representing a boundary surface S of refraction. A vector N_IN is a normal vector of the boundary surface S at an incident point PI.

A vector V_OUT is a direction vector of a refracted ray on the exit surface 6, and a vector N_OUT is a normal vector of the exit surface 6 at a point PO on the intersection line 9.

If it is required that the direction vector V_OUT of the finally determined ray be in parallel with the optical axis x—x, the path Lf is uniquely determined according to Snell's law when the lens thickness is specified.

That is, the direction of the vector V can be determined from the parallelism of the vector V_OUT and the optical axis x—x, a refraction angle formed by the normal vector N_OUT and the vector V_OUT, and a refractive index of the inner lens 5. Further, the normal vector N_IN and the boundary surface S can be determined from the vectors V and V_IN.

FIGS. 2–7 show, step-by step, a method of producing a die for the Fresnel lens steps 7, 7, . . . As is apparent from the fact that a cross-section obtained by cutting the Fresnel lens step 7 by a plane including the optical axis has a triangular shape, a die for making the lens can be produced by forming, by NC machining, V-shaped grooves corresponding to the respective steps on a die material.

Figure 2:
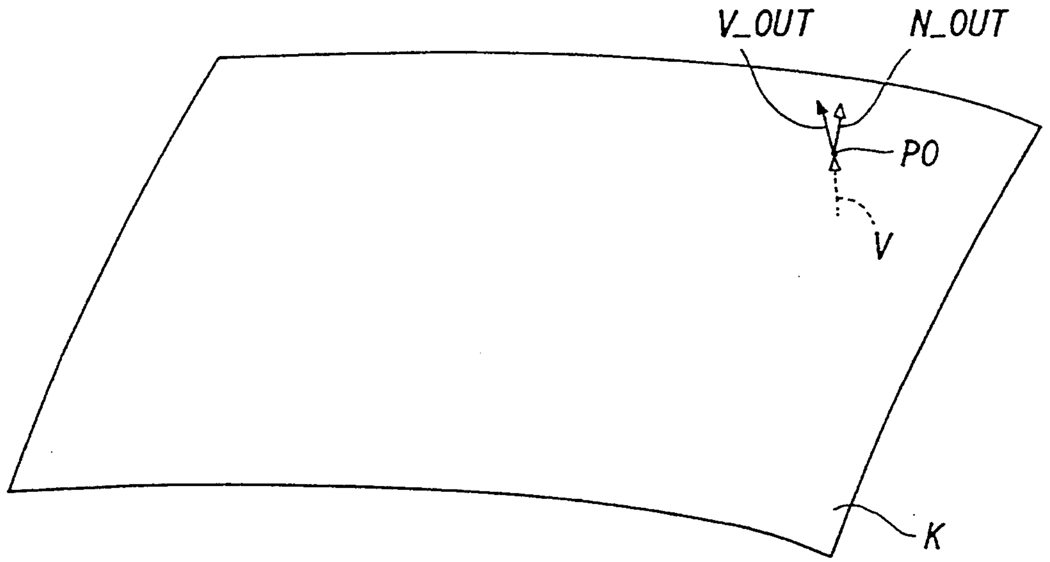
FIG. 2 is a drawing showing refraction by an exit surface of a lens in connection with the Fresnel lens step.

First, as shown in FIG. 2, on a design exit surface K, the vector V is determined according to the Snell's law from the normal vector N_OUT at the exit point PO and the direction vector V_OUT of a refracted ray that passes the point PO and is in parallel with the optical axis x—x. In general, the exit surface K is a free surface that cannot be expressed by an analytical function.

Figure 3:
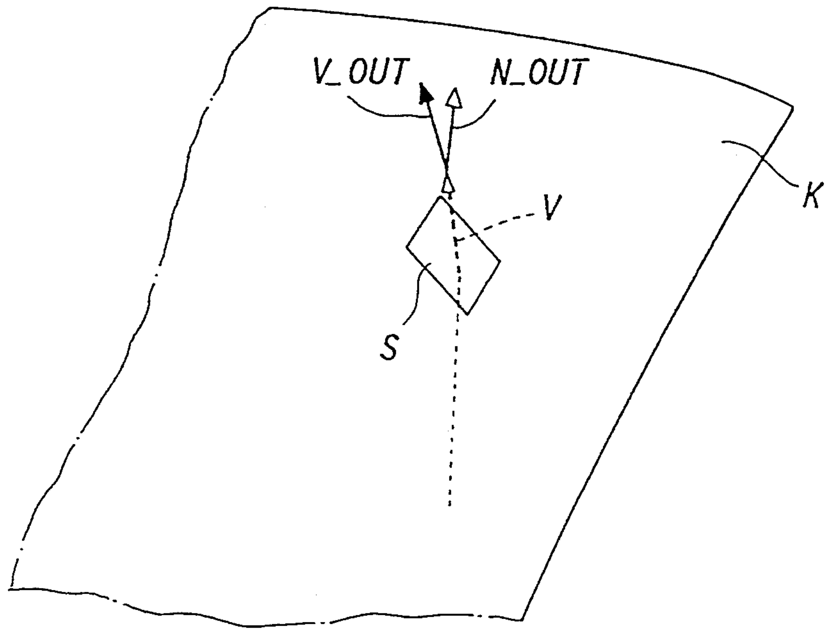
FIG. 3 is a drawing showing refraction by a refraction boundary surface of the Fresnel lens step.

Next, as shown in FIG. 3, the boundary surface S of refraction and the normal vector N_IN thereof are determined according to the Snell's law from the vector V and the direction vector V_IN of the incident ray.

Figure 4:
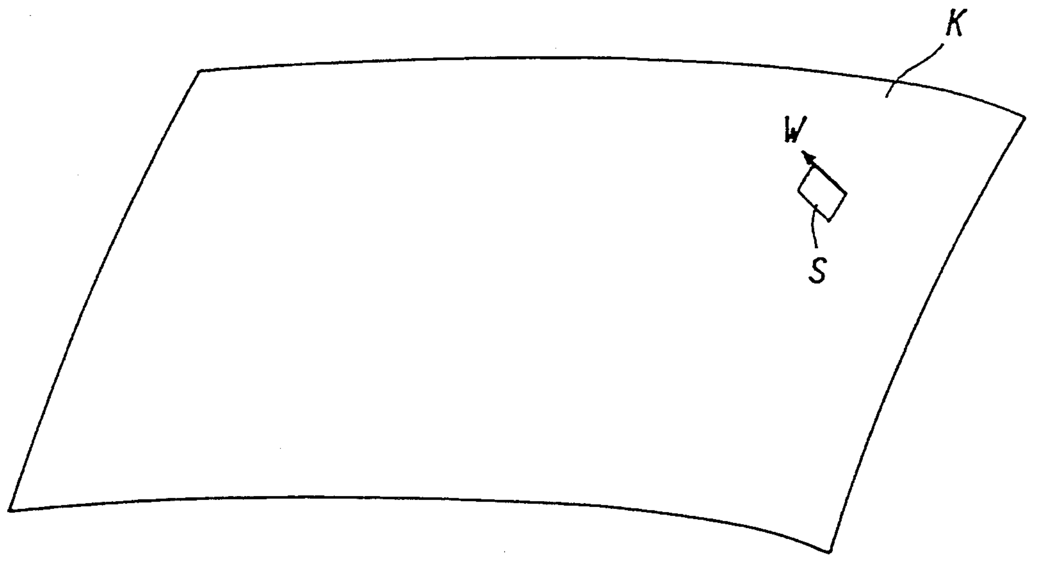
FIG. 4 is a drawing showing a direction in which the refraction boundary surface of the Fresnel lens step is formed.

Then, as shown in FIG. 4, an outer product (vector product) of the vectors N_OUT and N_IN is calculated as a vector W, which is contained in the boundary surface S and has a direction indicating a forming direction of the boundary surface S.

Figure 5:
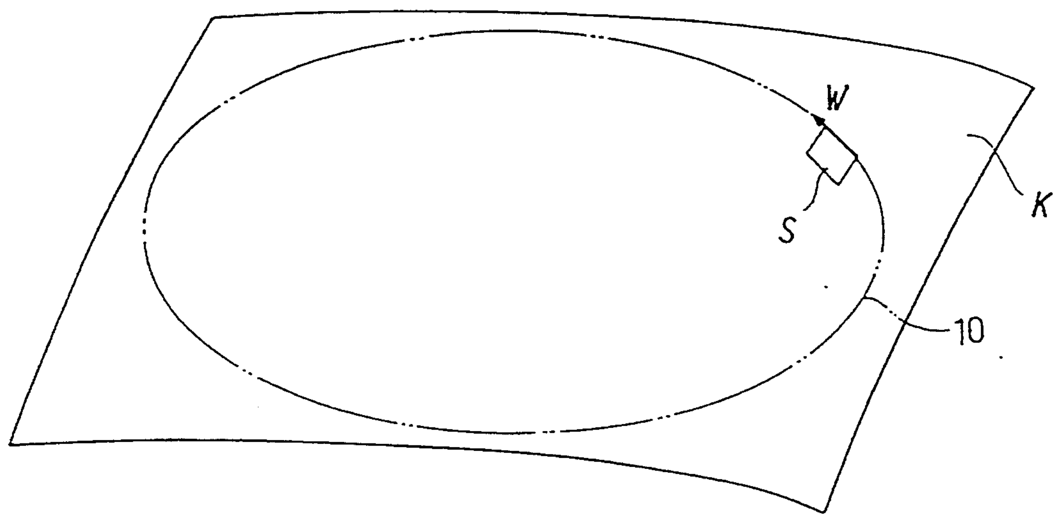
FIG. 5 is a drawing showing a closed curve that is needed in a process of machining the refraction boundary surface of the Fresnel lens step.

FIG. 5 shows a closed curve 10, which is a spline curve having vectors W sequentially obtained at the respective varying points PO as tangential vectors. The closed curve 10 has the optical axis x—x as its center line and is located on the light source side of the exit surface K, and serves as a reference line for machining the die.

In general, the closed line 10 is not circular when viewed along the optical axis, which is understood by considering that it is a very special case that the boundary surfaces S at the respective points are included in a single sphere.

Figure 6:
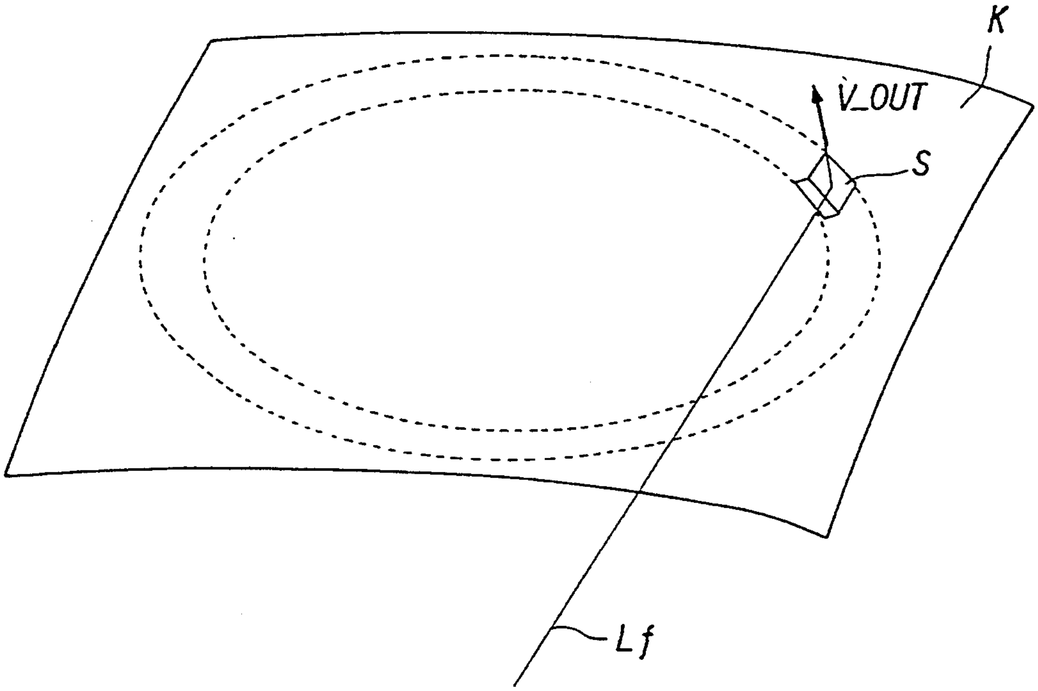
FIG. 6 is a drawing showing a light path with respect to part of the Fresnel lens steps.

As shown in FIG. 6, the incident ray is refracted by the very small surface S formed under the exit surface K, and further refracted by the exit surface K to exit as a ray in parallel with the optical axis. By connecting the very small surfaces S along the closed curve 10, a continuous boundary surface relating to one Fresnel step 7 is formed.

Figure 7:
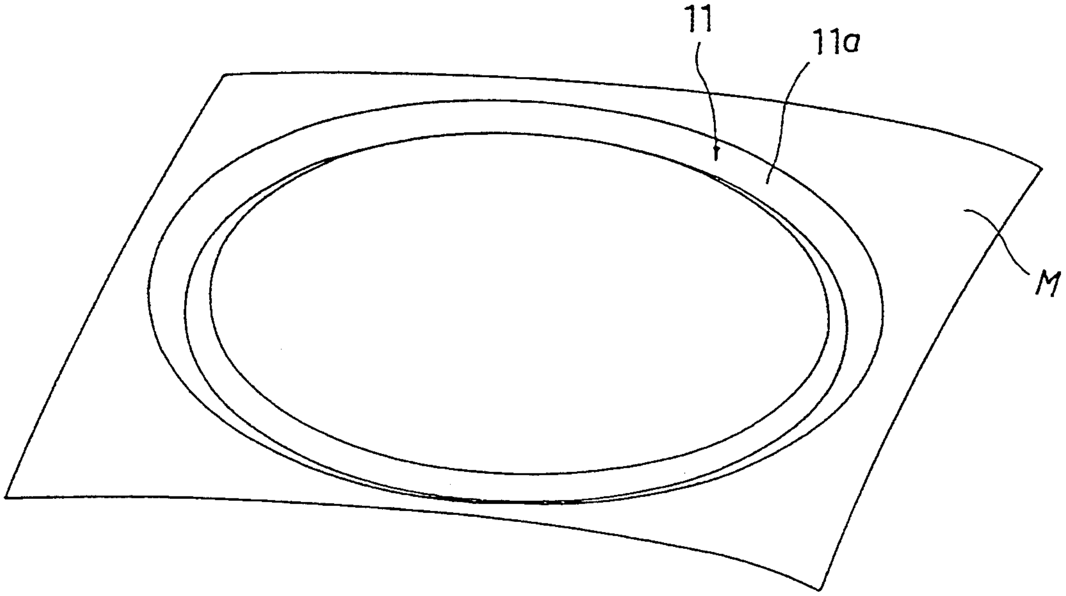
FIG. 7 is a drawing showing a V-shaped groove formed on a die that corresponds to the refraction boundary surface of the Fresnel lens step.

FIG. 7 shows how a V-shaped groove 11 is formed on a die material M by controlling the movement of a cutting tool along the closed curve 10. An outside slanting surface 11*a* of the V-shaped groove 11 relates to the formation of the incident surface of the Fresnel lens step 7. An angle of an inside slanting surface of the V-shaped groove 11 with respect to the optical axis is set at a constant value for convenience of the die extraction.

Next, the formation of the prism steps 8, 8, . . . is described.

Figure 8:
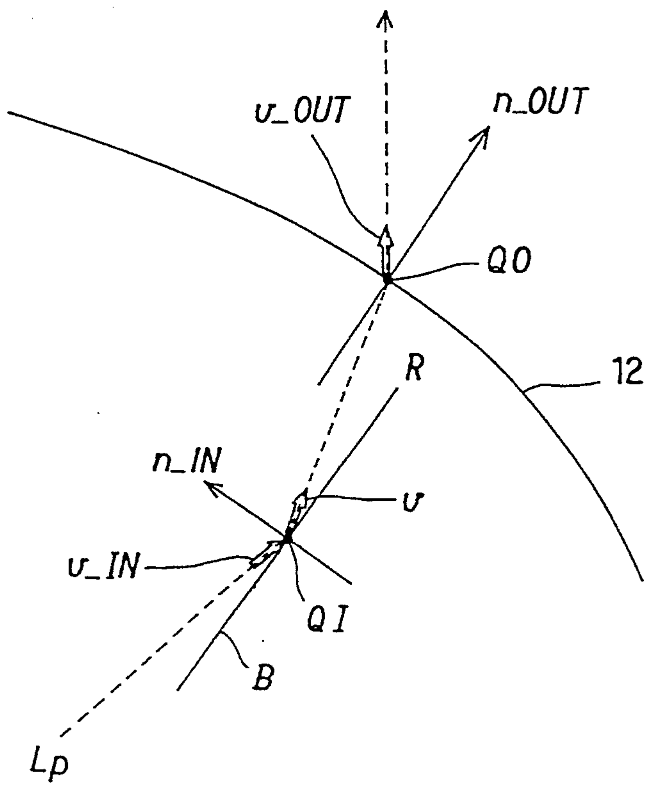
FIG. 8 is a light path diagram illustrating a prism step according to the invention.

FIG. 8 illustrates total reflecting and refracting actions of the prism steps 8, 8, . . . While passing through the lens step 8, the light ray is first refracted, then totally reflected, and again refracted.

Reference numeral 12 denotes a curve that represents the exit surface 6 of the inner lens 5, and that is a cross-sectional line obtained by cutting the exit surface 6 by a horizontal plane including the optical axis. This curve is first given as a shape conforming to the vehicle body shape.

A broken line Lp in FIG. 8 indicates a light path. A vector v_IN is a direction vector of an incident ray, and a vector v is a direction vector of a refracted ray.

Reference character B denotes a straight line that represents a total-reflection surface R, and a vector n_IN is a normal vector of the total-reflection surface R at an incident point QI.

A vector v_OUT is a direction vector of a refracted ray on the exit surface 6, and a vector n_OUT is a normal vector of the exit surface 6 at a point QO on the intersection line 12.

If it is required that the direction vector v_OUT of a finally determined ray be in parallel with the optical axis x—x, the path Lp is uniquely determined according to the Snell's law and the total-reflection law when the lens thickness is specified.

That is, the direction of the vector v can be determined from the parallelism of the vector v_OUT and the optical axis x—x, a refraction angle formed by the normal vector n_OUT and the vector v_OUT, and a refractive index of the inner lens 5. Further, the normal vector n—IN and the total-reflection surface R can be determined from the vectors v and v_IN.

It is noted that in the above calculation an approximation is used that the direction of the incident ray is not changed through the first refraction, or a direction change is negligibly small.

FIGS. 9–14 show, step-by step, a method of producing a die for the prism steps 8, 8, . . . The die is produced by forming, by NC machining, V-shaped grooves corresponding to the respective steps on a die material.

Figure 9:
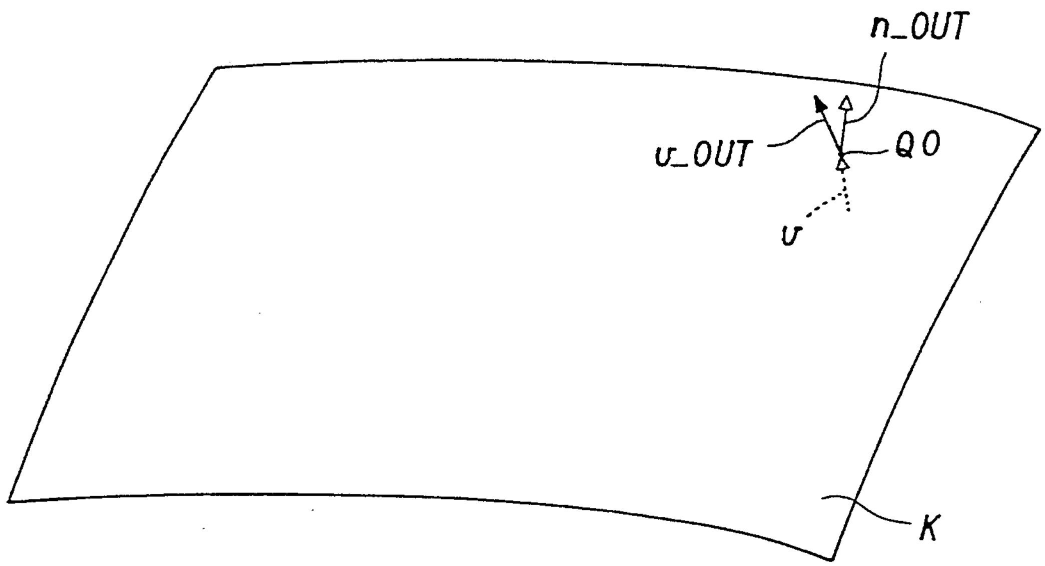
FIG. 9 is a drawing showing refraction by the exit surface of the lens in connection with the prism step.

As shown in FIG. 9, on the exit surface K, the vector v is determined according to the Snell's law from the normal vector n_OUT at the exit point QO and the direction vector v_OUT of a refracted ray that passes the point QO and is in parallel with the optical axis x—x.

Figure 10:
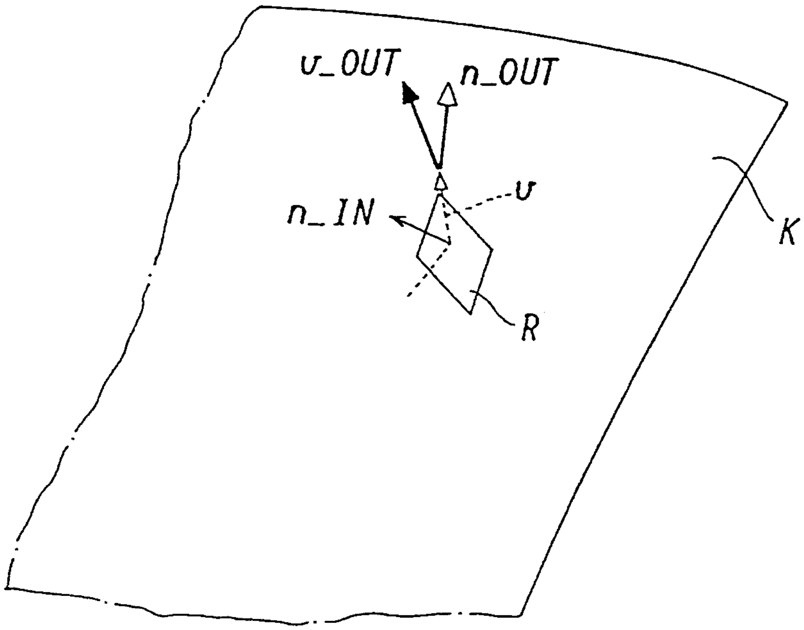
FIG. 10 is a drawing showing reflection by a total-reflection surface of the prism step.

Next, as shown in FIG. 10, the total-reflection surface R and the normal vector n_IN thereof are determined according to the reflection law from the vector v and the direction vector v_IN of the incident ray.

Figure 11:
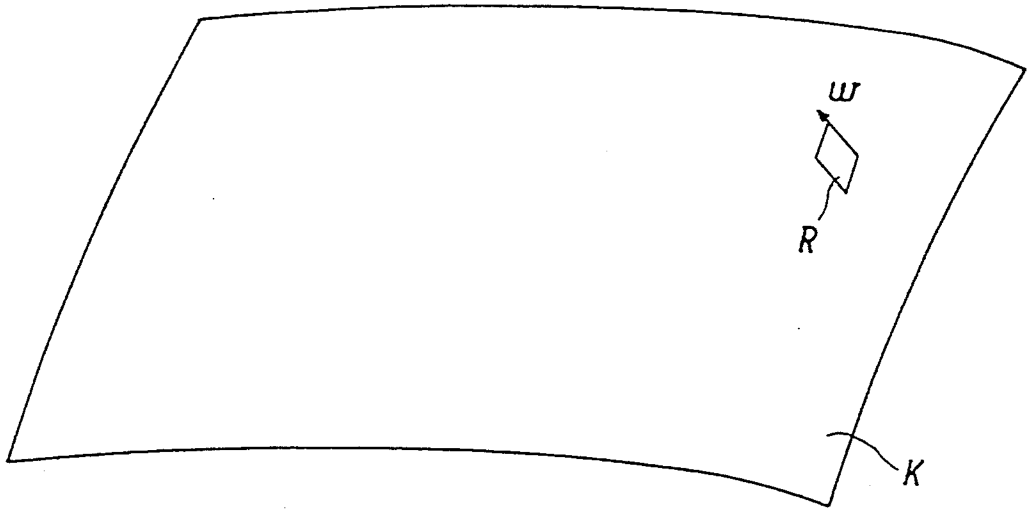
FIG. 11 is a drawing showing a direction in which the total-reflection surface of the prism step is formed.

Then, as shown in FIG. 11, an outer product (vector product) of the vectors n_OUT and n_IN is calculated as a vector w, which is contained in the total-reflection surface R and indicates a forming direction of the total-reflection surface R.

Figure 12:
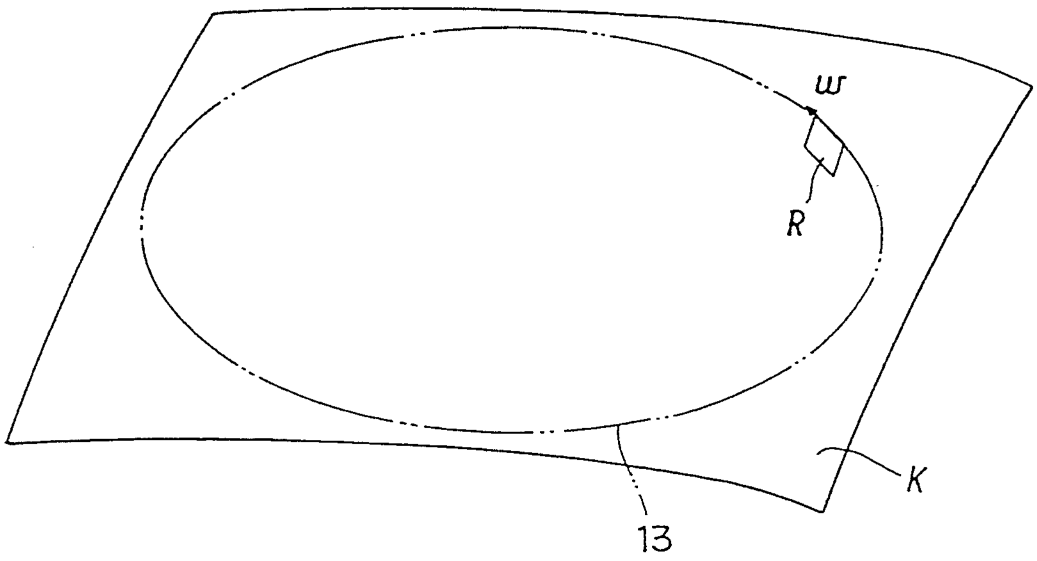
FIG. 12 is a drawing showing a closed curve that is needed in a process of machining the total-reflection surface of the prism step.

FIG. 12 shows a closed curve 13 that is obtained as a spline curve, which is a spline curve having vectors w sequentially obtained at the respective varying points QO as tangential vectors. The closed curve 13 is a machining line having the optical axis x—x as its center line and located on the light source side of the exit surface K.

It is noted that in general the closed curve 13 is not circular when viewed along the optical axis.

Figure 13:
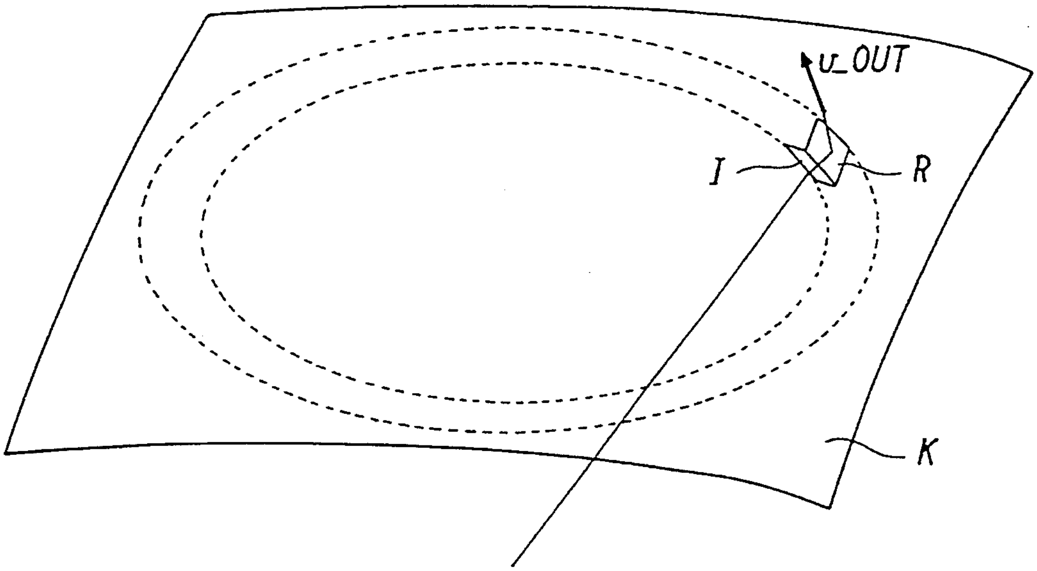
FIG. 13 is a drawing showing a light path with respect to part of the prism step.

As shown in FIG. 13, the incident light is first refracted by a very small incident surface I formed under the exit surface K, then reflected by the very small total-reflection surface R, and again refracted by the exit surface K, to finally exit in parallel with the optical axis. A continuous total-reflection surface relating to one prism step 8 is formed by connecting the very small total-reflection surfaces R along the closed curve 13.

Figure 14:
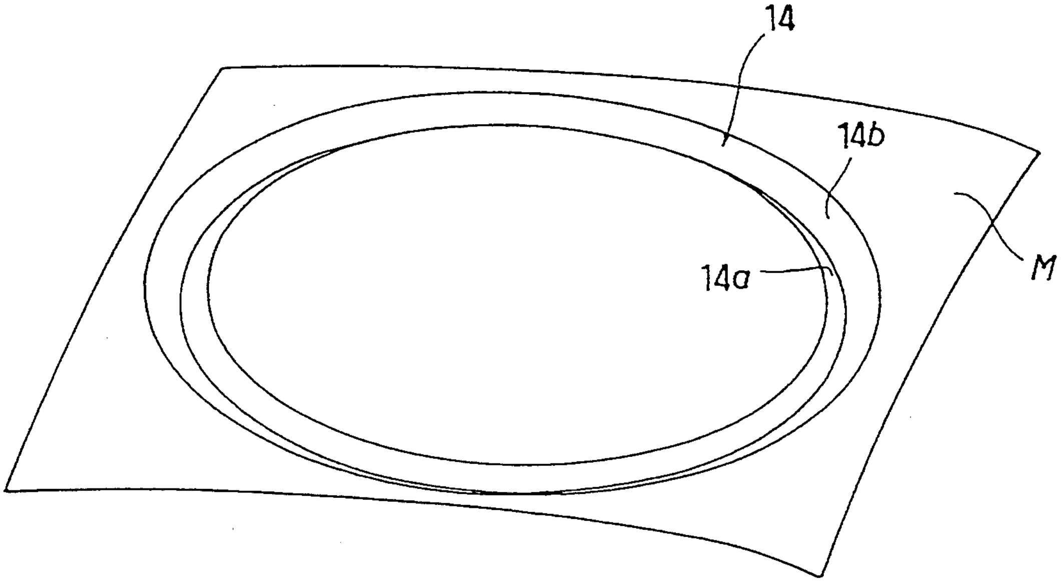
FIG. 14 is a drawing showing a V-shaped groove formed on the die that corresponds to the total-reflection surface of the prism step.

FIG. 14 shows a V-shaped groove 14 formed by a cutting tool along the closed curve 13. An inside slanting surface 14*a* of the V-shaped groove 14 relates to the formation of the incident surface I of the prism step 8, and an outside slanting surface 14*b* of the groove 14 relates to the formation of the total-reflection surface R of the prism step 8. An angle of the slanting surface 14*a* with respect to the optical axis is set at a constant value for convenience of the die extraction.

Figure 15:
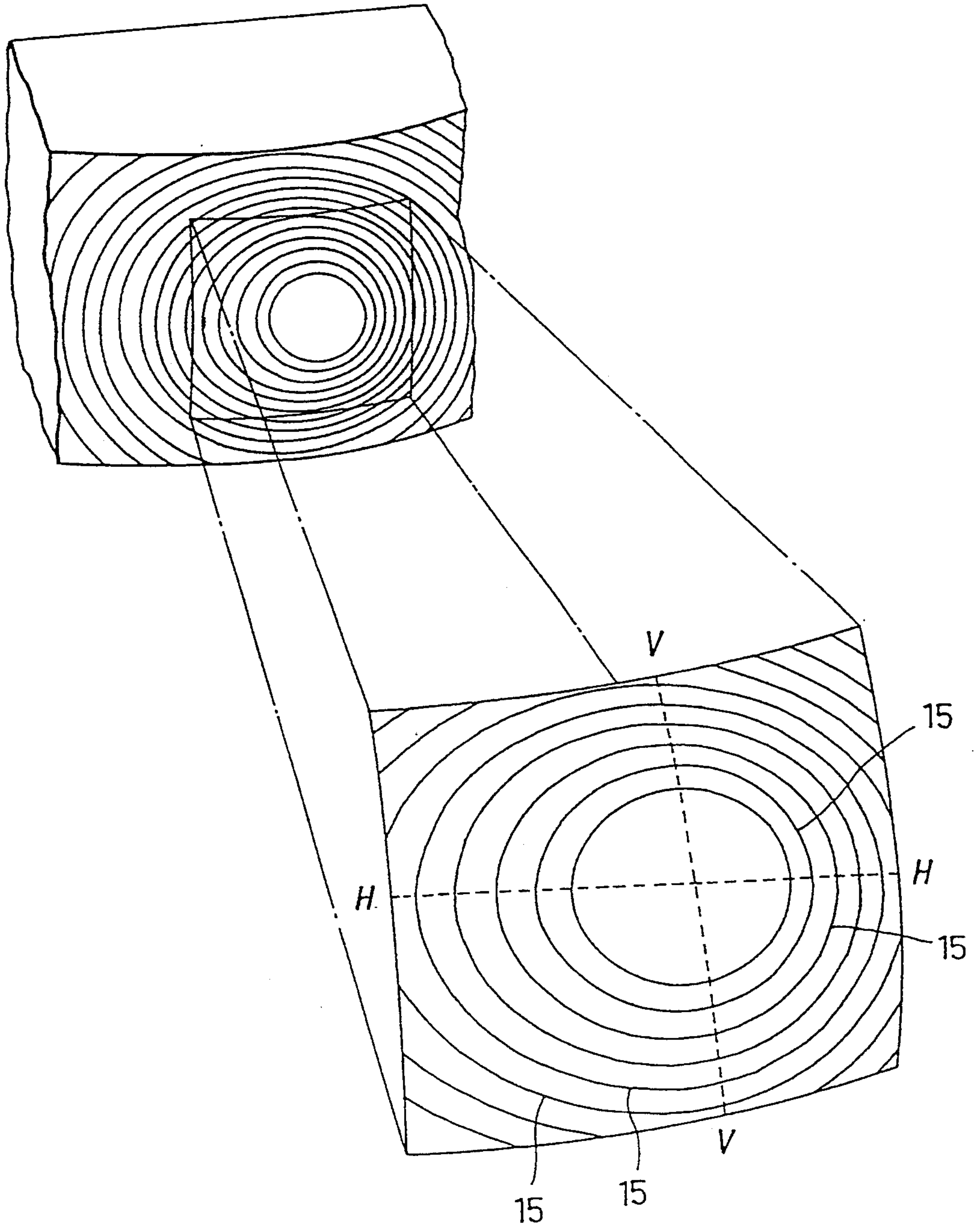
FIG. 15 is a drawing showing the closed curves used for the formation of the V-shaped grooves in machining the die for an inner lens.

In FIG. 15, the part, in the vicinity of the optical axis, of the die (including the closed curves 10, 13) for the inner lens 5 is enlarged.

As described above, it is rare that a lens for a vehicular lamp has a complicated surface. That is, in general, it consists of a plate-like main portion and an increasingly curved portion that is continuous with the main portion.

Reference numerals 15, 15, . . . in FIG. 15 denote closed curves serving as reference in forming V-shaped grooves on the die. The part of the closed curves 15, 15, located on the right side of the V—V line are related to the steps to be formed on the plate-like portion 5*a* of the inner lens 5, and have the same intervals on the H—H line.

Points on the H—H line are selected as the origins of the closed curves 15, 15, . . .

The remaining part of the closed curves 15, 15, . . . located on the left side of the V—V line are related to the steps to be formed on the curved portion 5b of the inner lens 5. One can find a tendency that the interval of the closed curves 15, 15, . . . gradually increases as the position goes along the closed curve from its intersection with the V—V line toward its intersection with the H—H line.

That is, the closed curves 15, 15, . . . are obtained by first arranging, at regular intervals, the origins for forming those curves on an intersection line obtained by cutting the flat portion of the reference surface of the die by a horizontal plane including the optical axis, and then performing the spline approximation as described above in connection with FIGS. 5 and 12. One closed curve generally assumes a circular arc around the flat portion of the die, and assumes a shape expanded outward from a circular arc around the curved portion of the die.

Therefore, the inner lens 5 has such features in configuration that the boundary lines between the adjacent steps formed on the plate-like portion 5a are concentric circular arcs, and that the boundary lines between the adjacent steps formed on the curved portion 5b are curves gradually deviating from concentric circular arcs.

Thus, as is apparent from the process of forming the Fresnel lens steps 7, 7, . . . and the prism steps 8, 8, . . . , the boundary surfaces of refraction and the total-reflection surfaces are defined with the exit surface 6 of the inner lens 5 as the reference so that at each position the refracted ray is directed in parallel with the optical axis x—x. Therefore, the precise light path control can be performed in accordance with the surface shape of the inner lens 5.

As is apparent from the above description, according to the lens for use in a lamp and the method of producing the die therefor of the invention, the steps can be designed by defining the slopes of the boundary surfaces of refraction of the Fresnel lens steps or those of the total-reflection surfaces of the prism steps in accordance with the curved shape of the exit surface of the lens so that the refracted rays are always output from the exit surface as parallel rays. As a result, precise light distribution control can be performed in accordance with the laws of optics.

Although the above embodiment is directed to the case in which the invention is applied to the inner lens of the vehicular lamp, it is apparent that the invention is not limited to such a case but can generally be applied to a wide variety of lenses for lamps.

What is claimed is:

1. A lens for a lamp in which a large number of Fresnel lens steps are formed on an incident surface of the lens having a nonplanar portion, wherein, within said nonplanar portion, a tangential vector at an arbitrary point of a refraction boundary surface of the Fresnal lens steps is in the same direction as an outer product of a normal vector of the refraction boundary surface of the Fresnel lens steps and a normal vector of an exit surface of the lens at a refraction point where a ray refracted by the refraction boundary surface of the Fresnel lens steps is refracted.

2. A lens for a lamp as set forth in claim 1, wherein the rays refracted by the refraction boundary surface of the Fresnel lens step are refracted at the exit surface to become parallel rays.

3. A lens for a lamp as set forth in claim 1, wherein a large number of prism steps also are formed on the incident surface of the lens, and wherein a tangential vector at an arbitrary point of a total-reflection surface of the prism steps is in the same direction as an outer product of a normal vector of the total-reflection surface of the prism lens steps and a normal vector of an exit surface of the lens at a refraction point where a ray reflected by the total-reflection surface of the prism steps is refracted.

4. A lens for a lamp in which a large number of prism steps are formed on an incident surface of the lens having a nonplanar portion, wherein, within said nonplanar portion, a tangential vector at an arbitrary point of a total-reflection surface of the prism steps is in the same direction as an outer product of a normal vector of the total-reflection surface of the prism lens steps and a normal vector of an exit surface of the lens at a refraction point where a ray reflected by the total-reflection surface of the prism steps is refracted.

5. A lens for a lamp as set forth in claim 4, wherein the rays totally reflected by the total reflection surface of the prism step are refracted at the exit surface to become parallel rays.

6. A method of producing a die for forming a lens for a lamp having an optical axis and in which a large number of Fresnel lens steps are formed on an incident surface of the lens within a nonplanar portion of said lens, comprising the steps of:

(1) determining, according to the law of refraction and based on a normal direction at a refraction point of an exit surface and a direction of rays parallel to said optical axis, a direction of an incident ray with respect to the exit surface so that exit rays from the lens become parallel rays;

(2) determining a refraction boundary surface according to the law of refraction in the case of the Fresnel lens steps, based on a direction of an incident ray with respect to the incident surface of the lens and the direction of the incident ray with respect to the exit surface that is obtained in step (1);

(3) employing a vector calculated as an outer product of a normal vector of the boundary surface that is obtained in step (2) and the normal vector at the refraction point of the exit surface in step (1) as a direction vector determining a direction of forming said boundary surface of step (2);

(4) generating a closed curve by connecting the direction vectors obtained in step (3) as tangential vectors using spline approximation; and (5) forming, on a die material, a V-shaped groove having a slanting surface corresponding to the boundary surfaces obtained in step (2) along the closed curve obtained in step (4).

7. The method of producing a die for forming a lens for a lamp having a large number of Fresnel lens steps as set forth in claim 6, wherein said determination steps are conducted using Snell's law.

8. The method of producing a die for forming a lens for a lamp having a large number of Fresnel lens steps as set forth in claim 6, wherein said closed curve is not circular when viewed along said optical axis.

9. The method of producing a die for forming a lens for a lamp having a large number of Fresnel lens steps as set forth in claim 6, wherein said curve of step (4) has said optical axis at its center and is located on the light source side of said lens.

10. A method of producing a die for forming a lens for a lamp having an optical axis and in which a large number of prism steps are formed on an incident surface of the lens within a nonplanar portion of said lens, comprising the steps of:

(1) determining, according to the law of refraction and based on a normal direction at a refraction point of an exit surface and a direction of rays parallel to said optical axis, a direction of an incident ray with respect to the exit surface so that exit rays from the lens become parallel rays;

(2) determining a total-reflection surface according to the law of reflection in the case of the prism steps, based on a direction of an incident ray with respect to the incident surface of the lens and the direction of the incident ray with respect to the exit surface that is obtained in step (1);

(3) employing a vector calculated as an outer product of a normal vector of the total-reflection surface that is obtained in step (2) and the normal vector at the refraction point of the exit surface in step (1) as a direction vector determining a direction of forming the total reflection surface of step (2);

(4) generating a closed curve by connecting the direction vectors obtained in step (3) as tangential vectors using spline approximation; and (5) forming, on a die material, a V-shaped groove having a slanting surface corresponding to the total-reflection surfaces obtained in step (2) along the closed curve obtained in step (4).

11. The method of producing a die for forming a lens for a lamp having a large number of prism steps as set forth in claim 10, wherein said determination steps are conducted using Snell's law.

12. The method of producing a die for forming a lens for a lamp having a large number of prism steps as set forth in claim 10, wherein said closed curve is not circular when viewed along said optical axis.

13. The method of producing a die for forming a lens for a lamp having a large number of prism steps as set forth in claim 10, wherein said curve of step (4) has said optical axis at its center and is located on the light source side of said lens.

14. The method of producing a die for forming a lens having a large number of prism steps as set forth in claim 10, wherein a large number of Fresnel lens steps also are formed on the incident surface of the lens, said method further comprising the steps of:

(1) determining, according to the law of refraction and based on a normal direction at a refraction point of the exit surface and a direction of rays parallel to said optical axis, a direction of an incident ray with respect to the exit surface so that exit rays from the lens become parallel rays;

(2) determining a refraction boundary surface according to the law of refraction in the case of the Fresnel lens steps, based on a direction of an incident ray with respect to the incident surface of the lens and the direction of the incident ray with respect to the exit surface that is obtained in step (1);

(3) employing a vector calculated as an outer product of a normal vector of the boundary surface that is obtained in step (2) and the normal vector at the refraction point of the exit surface in step (1) as a direction vector determining a direction of forming said boundary surface of step (2);

(4) generating a closed curve by connecting the direction vectors obtained in step (3) as tangential vectors using spline approximation; and (5) forming, on a die material, a V-shaped groove having a slanting surface corresponding to the boundary surfaces obtained in step (2) along the closed curve obtained in step (4).

15. A lens for a lamp in which a large number of Fresnel lens steps are formed on an incident surface of the lens having a plate-like portion and a nonplanar portion, wherein the Fresnel lens steps are arranged substantially at regular intervals along a first radial line located in the plate-like portion of the lens, and a irregular intervals along a second radial line located in the nonplanar portion of the lens.

16. A lens for a lamp in which a large number of prism steps are formed on an incident surface of the lens having a plate-like portion and a nonplanar portion, wherein the prism steps are arranged substantially at regular intervals along a first radial line located in the plate-like portion of the lens, and a irregular intervals along a second radial line located in the nonplanar portion of the lens.

* * * * *